United States Patent [19]
Morimoto et al.

[11] Patent Number: 5,652,706
[45] Date of Patent: Jul. 29, 1997

[54] NAVIGATION SYSTEM WITH RECALCULATION OF RETURN TO GUIDANCE ROUTE

[75] Inventors: Kyoumi Morimoto, Nishio; Mitsuhiro Nimura, Okazaki; Shigekazu Ohara, Chiryuu; Kazuteru Maekawa, Aichi-ken; Hiroyoshi Masuda, Nagoya, all of Japan

[73] Assignee: Aisin AW Co., Ltd., Japan

[21] Appl. No.: 494,891

[22] Filed: Jun. 26, 1995

Related U.S. Application Data

[63] Continuation of Ser. No. 103,263, Aug. 9, 1993, abandoned.

[30]   Foreign Application Priority Data

Aug. 19, 1992 [JP] Japan ................................. 4-220112
Aug. 19, 1992 [JP] Japan ................................. 4-220514

[51] Int. Cl.⁶ ............................. G06G 7/78; G08G 1/123
[52] U.S. Cl. ........................ 364/449.4; 364/444.1; 364/443; 364/447; 364/444.2; 340/460; 340/990; 340/995; 340/988
[58] Field of Search .......................... 364/449, 443, 364/444, 450, 424.01, 424.02, 447, 424.03; 340/990, 995, 988, 460, 996, 692

[56]   References Cited

U.S. PATENT DOCUMENTS

| | | | |
|---|---|---|---|
| 4,879,658 | 11/1989 | Takashima et al. | 364/449 |
| 4,882,696 | 11/1989 | Nimura et al. | 364/449 |
| 4,937,753 | 6/1990 | Yamada | 364/449 |
| 4,939,650 | 7/1990 | Nishikawa | 364/424.02 |
| 4,939,662 | 7/1990 | Nimura et al. | 364/449 |
| 4,989,151 | 1/1991 | Nuimura | 364/449 |
| 5,043,902 | 8/1991 | Yokoyama et al. | 364/449 |
| 5,243,528 | 9/1993 | Lefebvre | 364/449 |
| 5,262,775 | 11/1993 | Tamai et al. | 364/449 |
| 5,291,412 | 3/1994 | Tamai et al. | 364/449 |
| 5,291,413 | 3/1994 | Tamai et al. | 364/449 |
| 5,291,414 | 3/1994 | Tamai et al. | 364/449 |
| 5,303,159 | 4/1994 | Tamai et al. | 364/449 |
| 5,311,434 | 5/1994 | Tamai | 364/444 |
| 5,323,321 | 6/1994 | Smith, Jr. | 364/444 |
| 5,359,529 | 10/1994 | Snider | 364/449 |
| 5,369,588 | 11/1994 | Hayami et al. | 364/449 |
| 5,508,930 | 4/1996 | Smith, Jr. | 364/449 |
| 5,508,931 | 4/1996 | Snider | 364/449 |
| 5,537,323 | 7/1996 | Schulte | 364/449 |

FOREIGN PATENT DOCUMENTS 04683 3/1992 WIPO.

*Primary Examiner*—Kevin J. Teska
*Assistant Examiner*—Jacques Louis-Jacques
*Attorney, Agent, or Firm*—Lorusso & Loud

[57]   ABSTRACT

Geographical, guide or search information and route information are stored in storage sections. An arithmetic section provides a route researching function with preference for the traveling direction of a vehicle. A route-calculating section is provided for re-calculating the route, and a route guide control system is also provided, inclusive of a route deviation-detecting section. The re-calculating section calculates either the shortest route from the point of deviation to the previous route or a new route to the destination. In case of the search of the shortest route to the previous route, the shortest route from the present location to the previous route is searched giving preference to the traveling direction, e.g. avoidance of a U-turn, on the basis of the search information relating to the immediate vicinity of the present location, so that the route to rejoin the previous route can be quickly calculated. In case of search of a new route, the whole route from the present location to the destination is searched, again giving weight to the present traveling direction, on the basis of the search information relating to the area between the present location and the destination, to guide the driver along a new route completely different from the previous one.

7 Claims, 20 Drawing Sheets

(1)

(2)

(3)

(4)

(5)

(6)

NAVIGATION SYSTEM WITH RECALCULATION OF RETURN TO GUIDANCE ROUTE

This application is a continuation of application Ser. No. 08/103,263, filed Aug. 9, 1993, now abandoned.

FIELD OF THE INVENTION

The present invention relates to a navigation system for use in a vehicle to guide it to a destination through a preselected route and, more particularly, to a vehicular navigation system having the capability of searching for a new route to follow if the vehicle inadvertently deviates from the initially determined route.

BACKGROUND OF THE INVENTION

A navigation system for use in a vehicle includes a display device which is used when a route is to be determined, or a display device which is opened automatically or according to a driver's request when the vehicle is to be guided by the navigation system. When conditions for determining an optimum route are inputted into a route setting map to start the route search, a detailed map containing the route (i.e., a route search map) is displayed. When the search is completed, a whole route map (i.e., a wide-area map) is displayed in a form to permit the driver to clearly recognize the whole route. The driver can visually and aurally recognize from the whole route map that specific route to be travelled from the present location to the destination. After this, the driver pushes a guide start button to initiate the guidance by means of the navigation system.

Of course, the route may be missed by a wrong turn, even with such road guidance. In order to prevent this problem, there is disclosed in Japanese Patent Laid-Open No. 173815/1989, for example, a system having the ability to instantly inform the driver of a deviation, if any, from the route and to re-search a new route.

According to the method of the prior art, at the location where the driver recognizes that he or she has deviated from the initially determined route, he or she is guided by a newly searched route to the destination. If this new route can not be found, the driver is guided to return the vehicle to the intersection where he or she left the original route. This may require the driver to reverse the direction of travel 180° so as to return to that location. Moreover, it takes a long time to search the new route and it may become necessary to stop the vehicle to wait for the new route search.

SUMMARY OF THE INVENTION

An object of the present invention is to provide a vehicular navigation system which re-searches only the near vicinity around a present location if the route is missed so that the driver may be guided to the shortest route from the present location to the initial route in a short time period.

Another object of the present invention is to provide a vehicular navigation system for searching a new route with preference for the present direction of travel to guide the driver in case of a deviation from the originally determined route.

Still another object of the present invention is to provide a vehicular navigation system for selecting the shortest route for return to the previously determined route and a route to the ultimate destination other than the previously determined route, conditionally automatic, to guide the driver.

In order to achieve the above-specified objects, according to a first aspect of the present invention, there is provided a vehicular navigation system for automatically guiding a driver of a vehicle along a preselected route, which system comprises: storage means storing geographical information and search information pertaining to the immediate vicinity of the present location; means for determining the present location of the vehicle; means for detecting a deviation of the vehicle from the preselected route; means for searching a route from the present location to the preselected route, responsive to detection of a deviation from the preselected route, with preference given to the present direction of travel of the vehicle on the basis of the search information; means for joining the searched route to the previous route to form a new route; and means for providing guidance along the new route.

According to a second aspect of the present invention, the storage means stores geographical information and the search information for searching the whole route between the present location and the destination, while giving preference to the present direction of travel of the vehicle, on the basis of said search information.

According to a third aspect of the present invention, the vehicular navigation system further includes means for selecting the individual routes, re-searched in the first and second aspects, according to input conditions or predetermined conditions; and means for controlling the guidance with the newly selected route.

DESCRIPTION OF THE PREFERRED EMBODIMENTS

Embodiments of the present invention will now be described with reference to the accompanying drawings.

Figure 1:
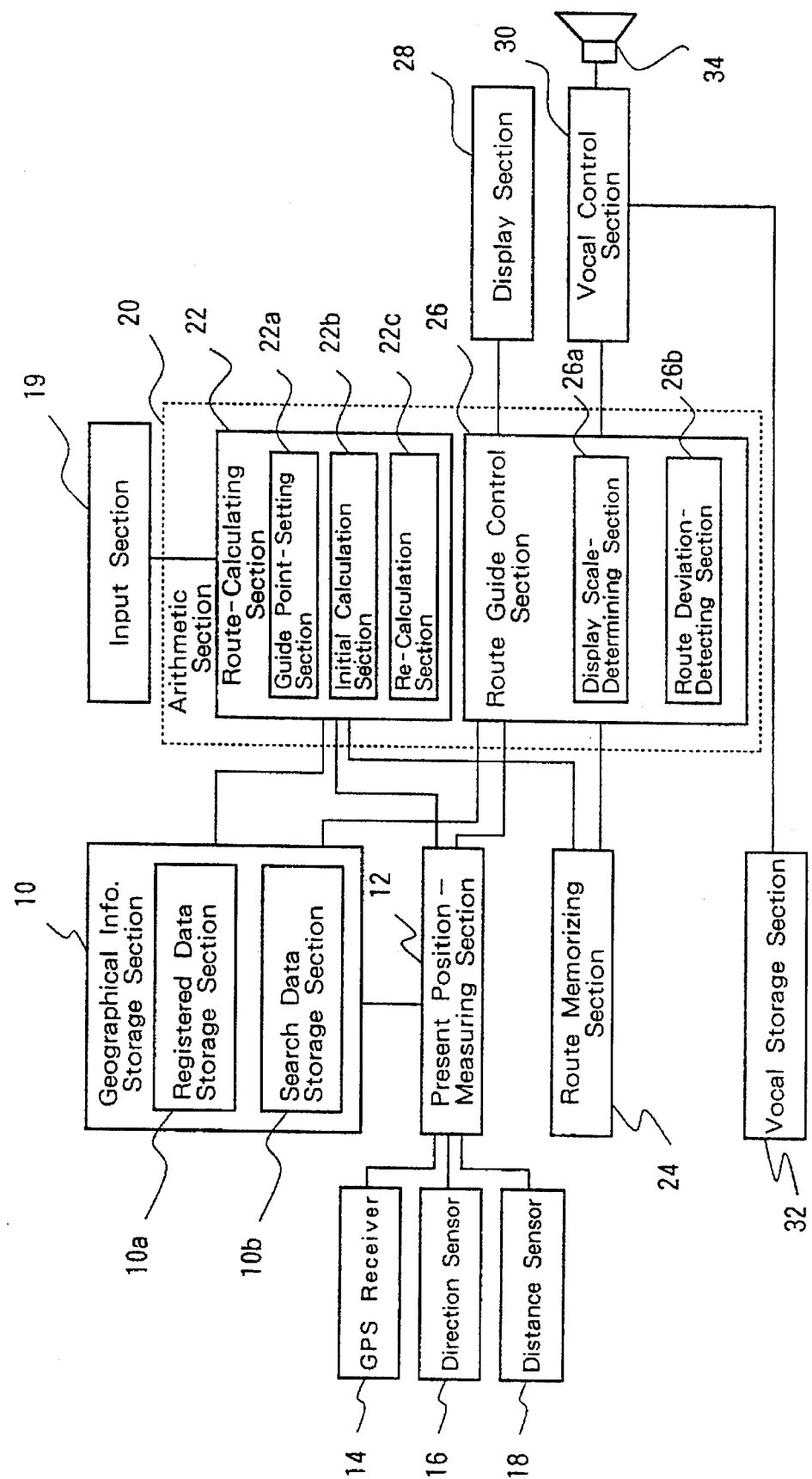
FIG. 1 is a block diagram illustrating the vehicular navigation system according to the present invention.

FIG. 1 illustrates the hardware components of an embodiment of a vehicular navigation system according to the present invention. This navigation system is shown as including a geographical information storage section 10 storing navigation data necessary for calculating routes, guide data necessary for guiding the driver of the vehicle, and other kinds of data. An arithmetic section 20 controls the whole system. A vocal control section 30 converts speech data into analog signals according to instructions from the arithmetic section 20 and also drives a loudspeaker 34 to provide voice guidance for guiding the driver. A display section 28 displays a route automatically or in response to a request of the driver and an input section 19 is provided for entering a destination or requesting guidance for a route. A present position locator section 12 determines the present position of the vehicle. A route memorizing section 24 stores the route data which are calculated by the arithmetic section 20 according to the destination.

The geographical information storage section 10 offers a database in which all the data, including geographical data, necessary for guidance along a route, data used to provide displays for guiding the driver, and other data are stored. The data concerning a final guide point are registered in advance in the system with respect to the destination to be set, and then are stored in a registered data storage section 10a. The data necessary for searching the route are stored in a search data storage section 10b.

The present position locator 12 determines the present position of the vehicle from the position information and azimuth information received by a GPS receiver 14 employing the global positioning system (GPS), the azimuth information which is obtained by a direction sensor 16, the distance information which is obtained by a distance sensor 18, and the geographical information which is read from the geographical information storage section 10. The present position locator 12 sends the present position information thus obtained to the arithmetic section 20. Here, the direction sensor 16 determines the direction in which the vehicle is to travel, from the geomagnetism and the relative azimuth of the vehicle. The distance sensor 18 determines the distance traveled by the vehicle from the number of revolutions of the wheels.

The input section 19 instructs the arithmetic section 20 to perform the processing operations necessary for navigation in accordance with the driver's request. For these operations, through the input section 19, the driver enters a destination and route setting conditions, changes or enters a selected destination and/or instructs a re-search, thus allowing the driver to obtain guidance information by means of a speech and/or visual display as required.

The arithmetic section 20 comprises a route-calculating section 22 and a route guide control section 26. The route-calculating section 22 sets the final guide point, if any, which is either obtained by calculations on the basis of the destination setting information or preset. The route-calculating section 22 further calculates a route to the destination according to the geographical information read from the geographical information storage section 10 and according to the present position information from the present position locator 12. The route-calculating section 22 then loads the data about this final guide point into the route memorizing section 24. The route guide control section 26 produces a vocal and/or visual display automatically or according to the request signal, depending upon the guide information stored in the geographical information storage section 10, the present position information and the route information.

The route-calculating section 22 includes: an initial calculation section 22b for initially calculating the whole route from the starting point to the guide point; a guide point-setting section 22a for setting the guide point after the destination has been set; and a re-calculation section 22c acting as means for realizing a function. The re-calculating section 22 determines a route, to the destination from the present position, in accordance with the route re-search instruction from the input section 19, on the basis of detection of deviation from the preselected route by the guide control section 26.

Figure 7:
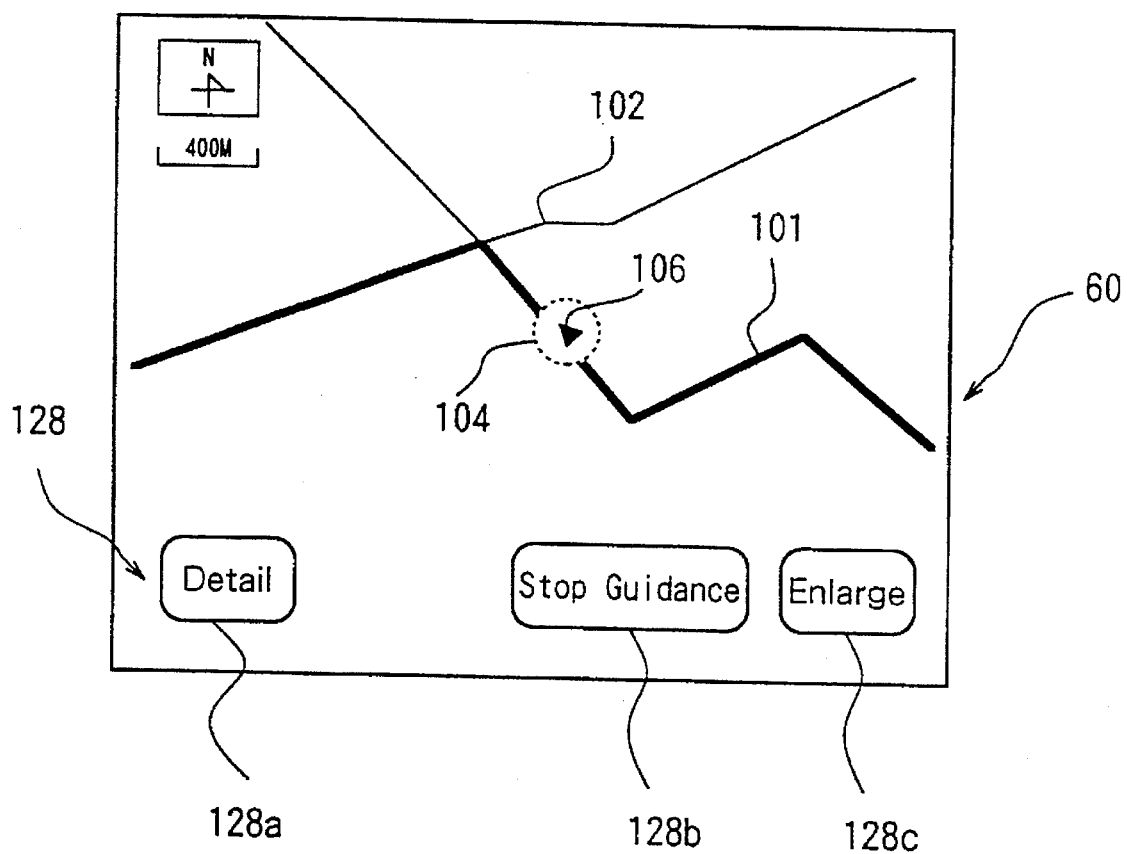
FIG. 7 is diagram illustrating one example of a section map on the display section of the same system.
Figure 8:
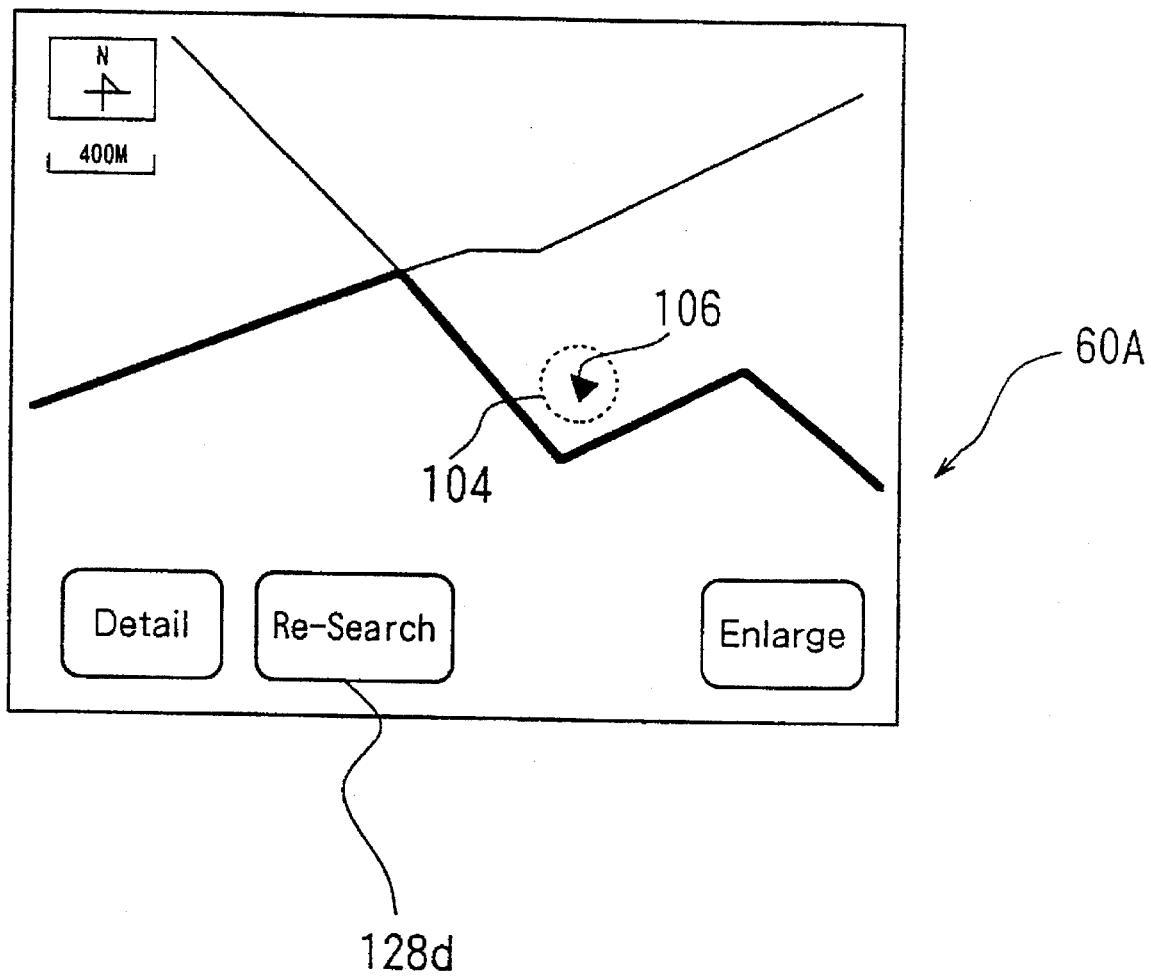
FIG. 8 is a diagram illustrating one example of a section map on the display section displayed in response to a determination that the vehicle has deviated from the preselected route.

When the guide point is set relative to the destination by the route-calculating section 22, by loading the destination into the destination setting map, the route guide control section 26 outputs the display of the destination confirming map, on which is an identified destination mark, for confirming the destination and a guide point mark. If the destination is confirmed in this map, the route search is started and a display of the selected route is fed to the display section 28 and is displayed in the whole route map. This route guide control section 26 includes: a display scale-determining section 26a and a route deviation-detecting section 26b. The display scale-determining section 26a determines a display scale, from the distance between the final guide point and the set destination, to enable display of both the set destination and the final guide point on a common map. The route deviation-detecting section 26b detects a deviation as positional deviation and azimuth deviation between the selected route and the present position. If a deviation is detected by the route deviation detecting section 26b, the display of a "stop guidance" "button" 128b, as shown in FIG. 7, is removed from the display of section map 60 and is replaced by display of a re-search button 128d, as shown in FIG. 8, to urge the driver to search the route again from the point of route deviation. This route deviation detection can optionally be the method disclosed in Japanese Patent Laid-Open No. 173815/1989, for example.

The display section 28 consists of a color CRT or color liquid-crystal display and is mounted in the instrument panel near the driver's seat. The driver can confirm the present location of the vehicle observing a section map or an intersection map. The driver can also obtain information about a forthcoming route. Furthermore, the driver confirms intersections at which the vehicle should turn, is well as the direction of the route, i.e., whether the vehicle should turn to the right or to the left at a given intersection. All maps necessary for navigation such as a route-setting map based on the geographical data and guide data processed by the route guide control section 26, a route search map, a route re-search map, a whole route map, local maps, intersection maps, and arrival guide maps are presented in the display section 28 in color.

The display section 28 is equipped with function buttons to set the route guidance and to switch one displayed map to another during the guidance. In particular, the display section 28 has a touch panel or screen with membrane switches corresponding to the displayed buttons. The aforementioned operations are carried out according to signals generated by touching the buttons. These buttons, the touch screen and the like together construct input signal generating means, which forms the input section 19. Detailed description of this input section 19 is omitted because the structure of this section is known in the art.

Figure 2:
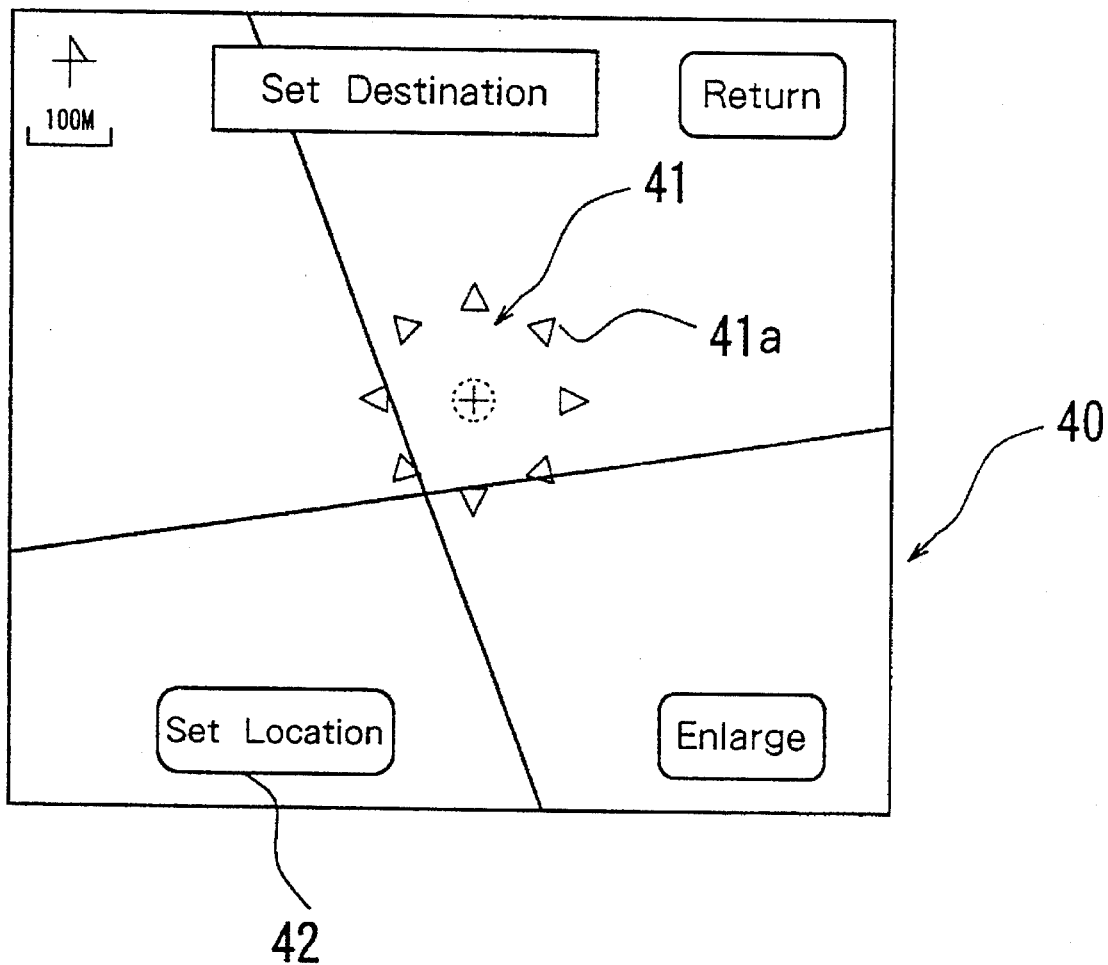
FIG. 2 is a diagram illustrating one example of a destination setting map on the display section of the system shown in FIG. 1.
Figure 3:
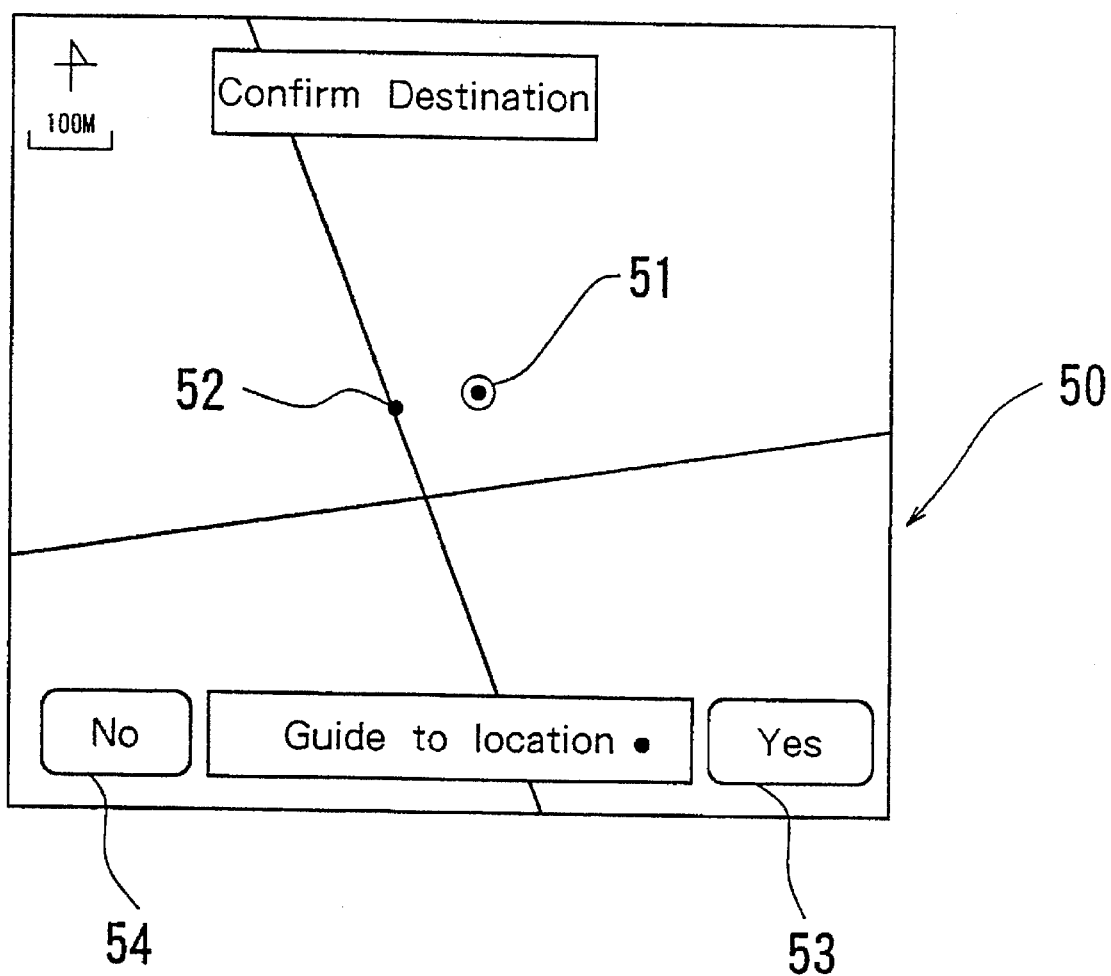
FIG. 3 is a diagram illustrating one example of a destination confirming map on the display section of the same system.

In a destination setting map 40 opened by selecting of same from a menu frame, as shown in FIG. 2, there are displayed a map of the vicinity around the destination and a cursor 41 which is located on (pointing to) the destination. By touching a triangle key 41a of the cursor, the cursor 41 is moved in the direction of the touched triangle key. The display of this cursor 41 is controlled by the input section 19. The cursor 41 is operated to bring its center to a predetermined position around the destination such as a parking area if the destination is, for example, a golf course, and a location setting button 42 is then pushed. Then, the guide point is located, and the display map is changed, once the guide point is located, to a destination confirming map 50, as shown in FIG. 3. On this destination confirming map 50, there are displayed not only a designated destination mark 51 and a guide point 52 on a road but also a message "Guide to location" for guidance to the final guide point 52. The "final guide point" will always be a point on a navigable road and will differ from the destination when the destination is not on a road. In other words, where the selected destination is not on a navigable road, the route-calculating section will select, as a "final guidance point", a point on a navigable road convenient to the destination and will use the "final guidance point" in the manner of a substitute for the destination in route calculation and guidance. Map 50 is displayed with a "Yes" button 53 and a "No" button 54 for confirming the destination and the guide point. If the "Yes" button 53 is pushed, the destination 51 and the guide point 52 are fixed as displayed on the map.

Figure 4:
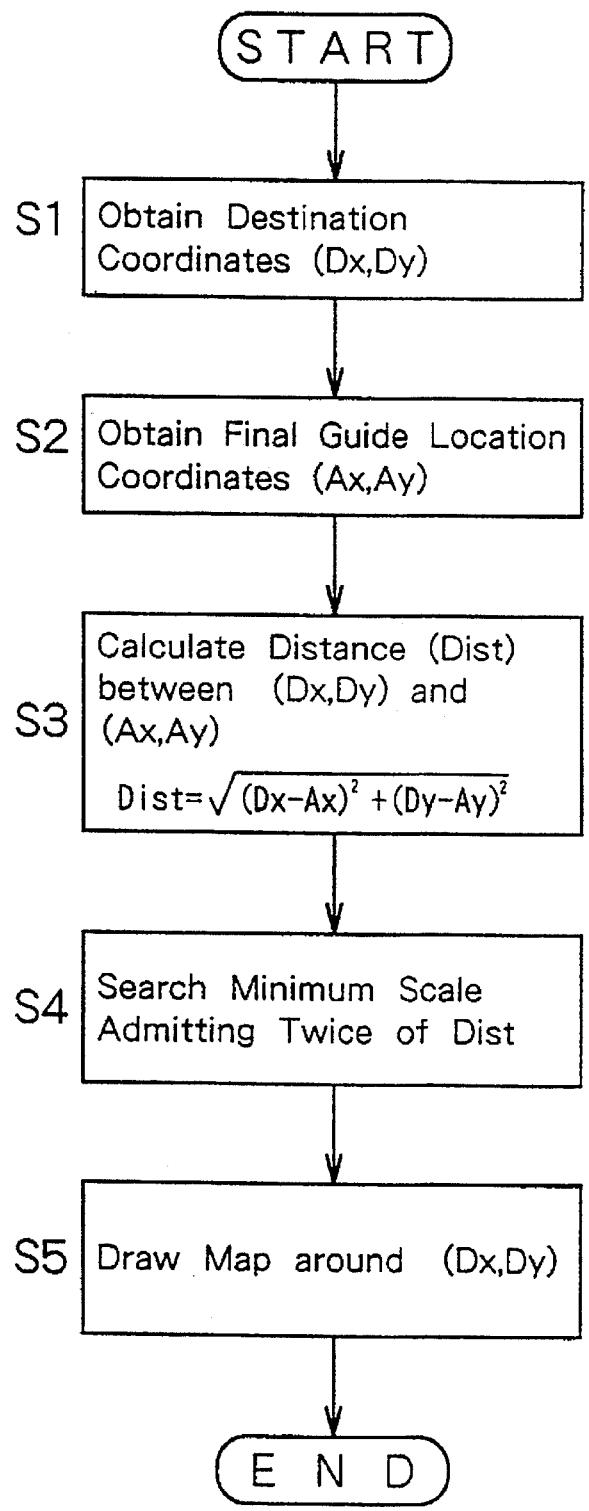
FIG. 4 is a flowchart for determining a display scale.

Here, the function by which the destination and the final guide point are displayed on a common map by the route guide control section 26 will be described. FIG. 4 is a flowchart illustrating a series of operations carried out to generate such a displays. Destination coordinates (Dx,Dy) and final guide location coordinates (Ax,Ay) are obtained (at S1 and S2) to calculate (at S3) the distance Dist=$\sqrt{(Dx-Ax)^2+(Dy-Ay)^2}$) between the destination coordinates and the final guide location coordinates. A minimum scale admitting twice of Dist is searched (at S4). A map is drawn (at S5) around the destination coordinates. This display is the destination setting map. Here, the "obtain" means the process for calculating the coordinates for the position indicated on the map.

Figure 5:
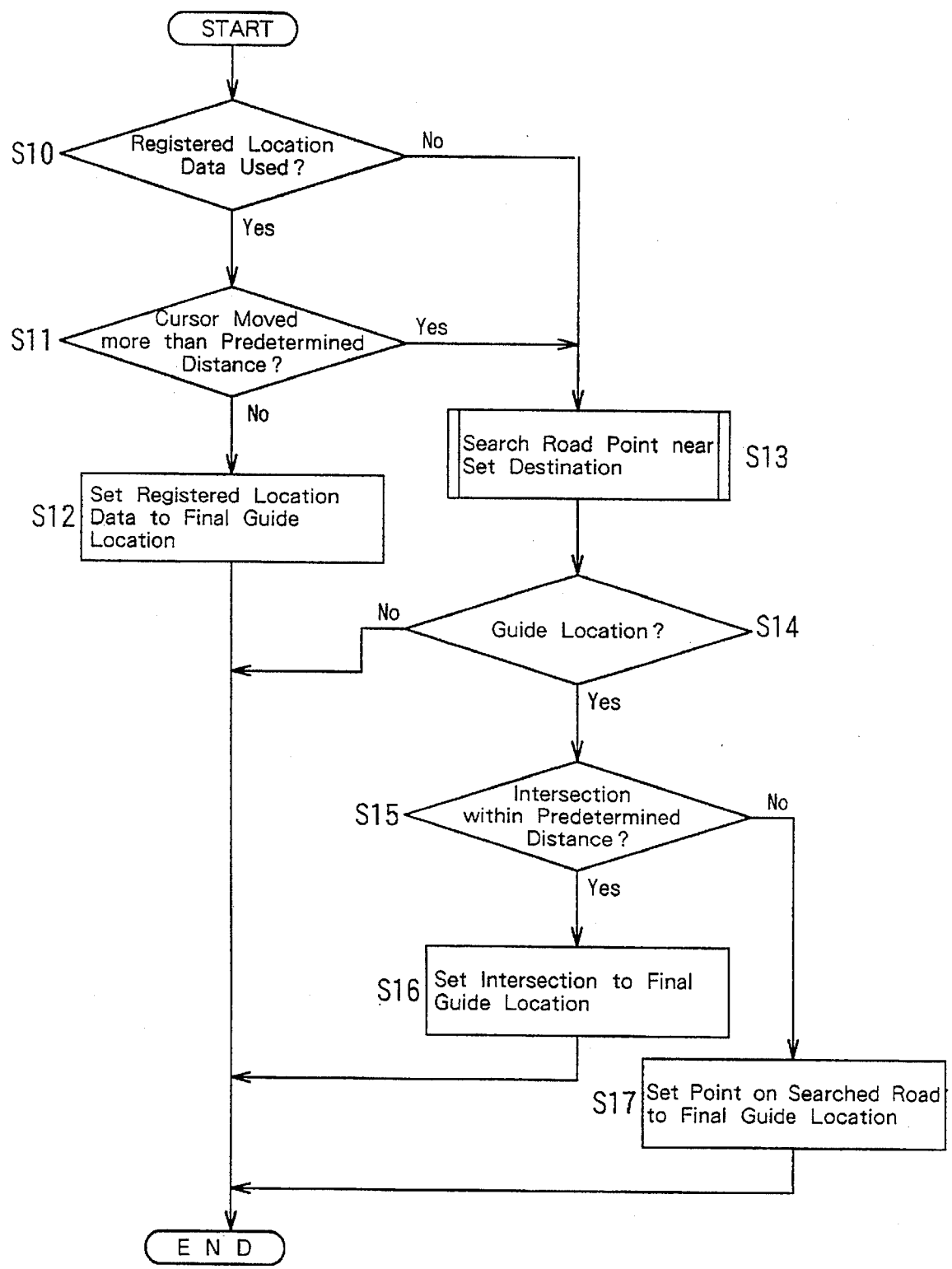
FIG. 5 is a flowchart for setting a final guide point.
Figure 6:
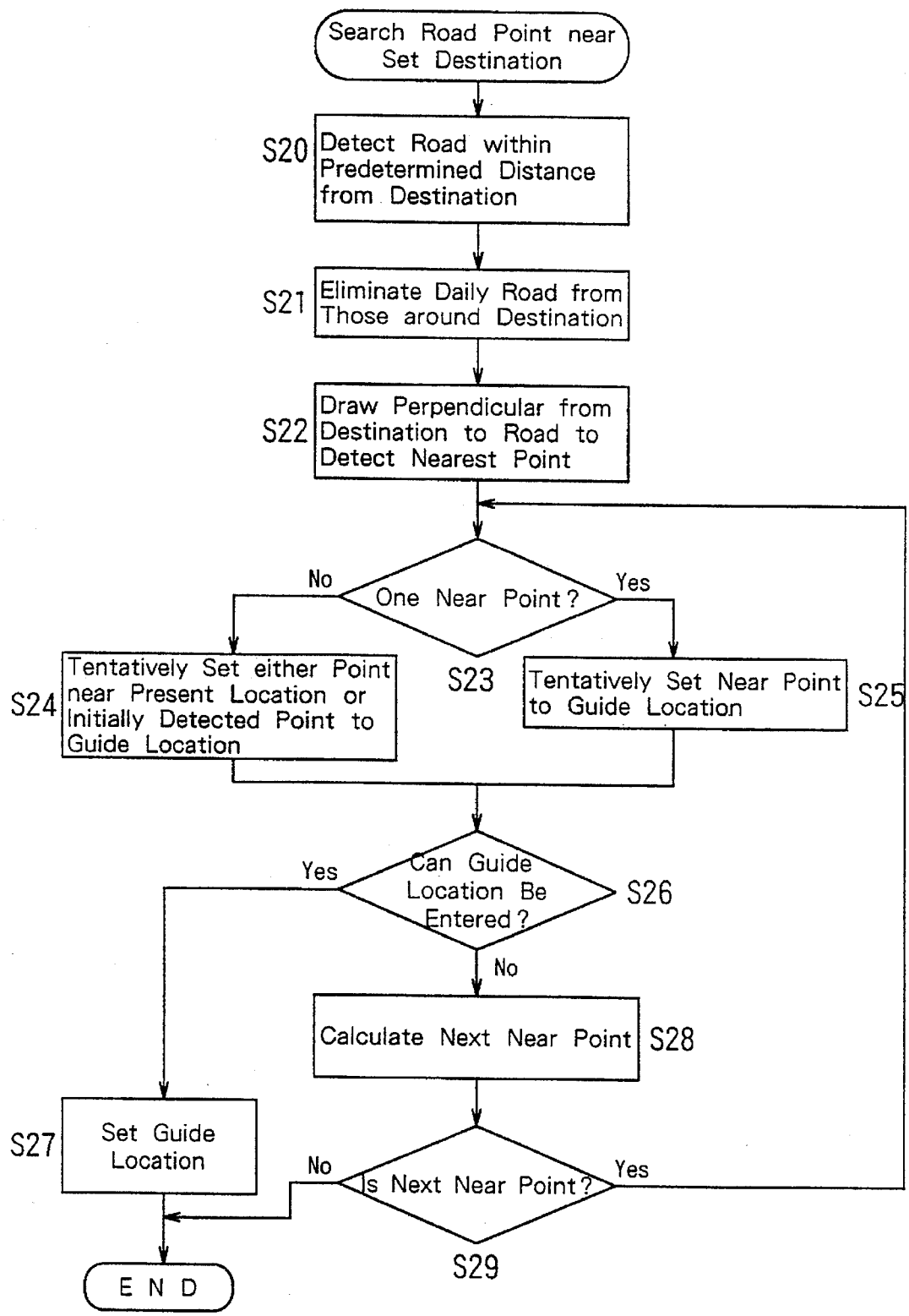
FIG. 6 is a flowchart for searching a guide point.

Here the guide location setting function of the route calculating section 22 will be described with reference to FIGS. 5 and 6. FIG. 5 is a flowchart illustrating a series of operations to be carried out for setting the final guide point. FIG. 6 is a flowchart illustrating a series of operations to be carried out for searching a point on a road close to the set destination (as will be referred to as the "search flow").

Registered destination data, such as business listings, are prestored in "Registered Data Storage Section" (10a, FIG. 1). When destination data is chosen by the user's operation of the navigation system, location data for a "final guide point" is preselected and registered in the "Registered Data Storage Section". When the setting of a destination is completed on the destination setting map, the search flow for setting the final guide point is started. First of all, it is decided (at S10) whether or not the final guide point is a registered location. If NO, the search flow is executed. If a registered location, it is decided (at S11) whether or not the cursor has been moved a predetermined distance or more. If YES, it is decided that the destination is different from the registered location, and a point on a road close to the set destination is searched. If the cursor movement is within the predetermined distance, the registered location data are set as a final guide location (at S12) and are stored in the route memorizing section 24. On the basis of the registered location data, the route guide control section 26 outputs the display instruction of the final guide location mark to the display section 28.

Whether or not a later-described search flow has been executed to set the guide location is determined (at S14). If NO, the routine is ended. If YES, it is decided (at S15) whether or not an intersection is within a predetermined distance. If YES, the intersection is set (at S16) as the final guide location. If NO, on the other hand, a point on the searched road is set as the final guide location (S17).

Here will be described the search for the guide location with reference to FIG. 6. First of all, roads within a predetermined distance from the destination are located (at S20), and roads such as one-way roads and roads with school zones are eliminated (at S21) from the located roads. Then, perpendiculars are drawn (at S22) from the destination to each adjacent road, to detect the nearest point on that road. Since there may be a plurality of near road points detected, their number is decided (at S23). If the points are plural, either the point nearest the present location or the point initially located is tentatively set (at S24) as the guide location. If only one, on the other hand, the nearest point is tentatively set (at S25) as the guide location. It is decided (at S26) whether or not there is a road to be entered to the tentatively set guide location. If YES, this guide location is set (at S27) as the final one. Otherwise, a next nearest point is calculated (at S28), and the result is decided (at S29). In other words, the routine is ended if the next nearest point is absent. If this next nearest point is present, on the other hand, the routine is returned to S23, at which the number of the near points is decided to tentatively set the guide location. Then the routine of S26 to S29 is likewise executed. The purpose of this routine is to find the nearest navigable point which can be reached. First of all, a geometrical "Nearest Point" is detected in S22. But this "Nearest Point" may be plural in number. In case plural "Nearest Point" are found, one "Nearest Point", either "Point near Present Location" or "Initially Detected Point", is determined. If plural "Point near Present Location" are found, the "Initially Detected Point" of those is set as the "Guide Location."

According to the present embodiment, in case an arbitrary location is selected for the destination from the detailed map, the arithmetic operations are started from the position of the destination to set the final guide location.

On the other hand, if the destination is selected from the menu frame and is set by moving the cursor on the map shown in FIG. 2, the final guide location for the initial destination is set if the moving distance of the destination set from the initial destination is within a predetermined range. Otherwise, the final guide location is set by the arithmetic processing from the position of the destination.

In the absence of the registered location data or in case the destination is changed on the destination setting map, the guide location is searched. In case the destination is selected from the menu,, it is also possible to set the preset final guide location. If the destination is a ○ ○ golf course, for example, the system is stored in advance with a △ △ intersection or an intermediate point of the road as the final guide location.

Thus, if the destination is set, the final guide location corresponding to the destination input on the basis of the registered location information is set, and the destination and the final guide location are displayed on the map. Whether the destination and the final guide location are in common or different positions can be confirmed by observing the map, and the optimum final guide location for the destination can be determined by setting the final guide location on the basis of the registered location information. In case the scale of displaying the destination and the final guide location on a common map is automatically selected, the departure and direction of the final guide location from the destination can be visually and aurally confirmed.

Figure 9:
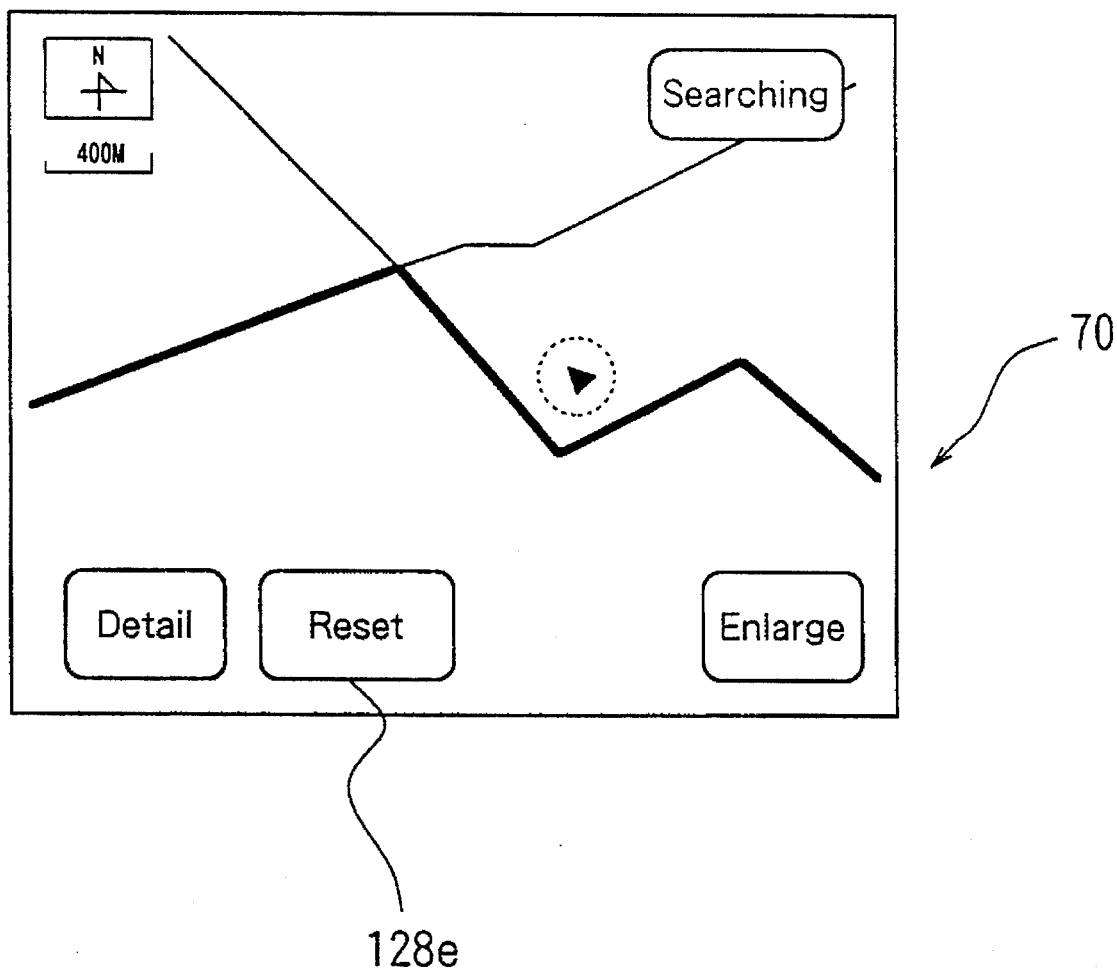
FIG. 9 is a diagram illustrating one example of a route re-search map on the display section of the same system.

A section map 60 is displayed upon the start of guidance, as shown in FIG. 7, with a determined route 101, a road 102 not part of the determined route, a vehicle mark 104 and a traveling direction mark 106 displayed on the section map 60. The section map 60 is further displayed with function buttons 128 for choosing among various display options. In the present example, the map is formed with the route in red, a detail button 128a for enlarging a local area, a guidance stop button 128b for stopping the guidance, and a wide-area button 128c for displaying the whole route, at the driver's option. If the deviation from the route exceeds a predetermined distance during guidance, the guidance stop button 128b disappears, and the map changes to a section map 60A on which is displayed a re-search button 128d, as shown in FIG. 8. If this re-search button 128d is pushed, the route re-search is started, and a route re-search map 70 shown in FIG. 9 is opened to display an indication of "Searching".

Figure 10:
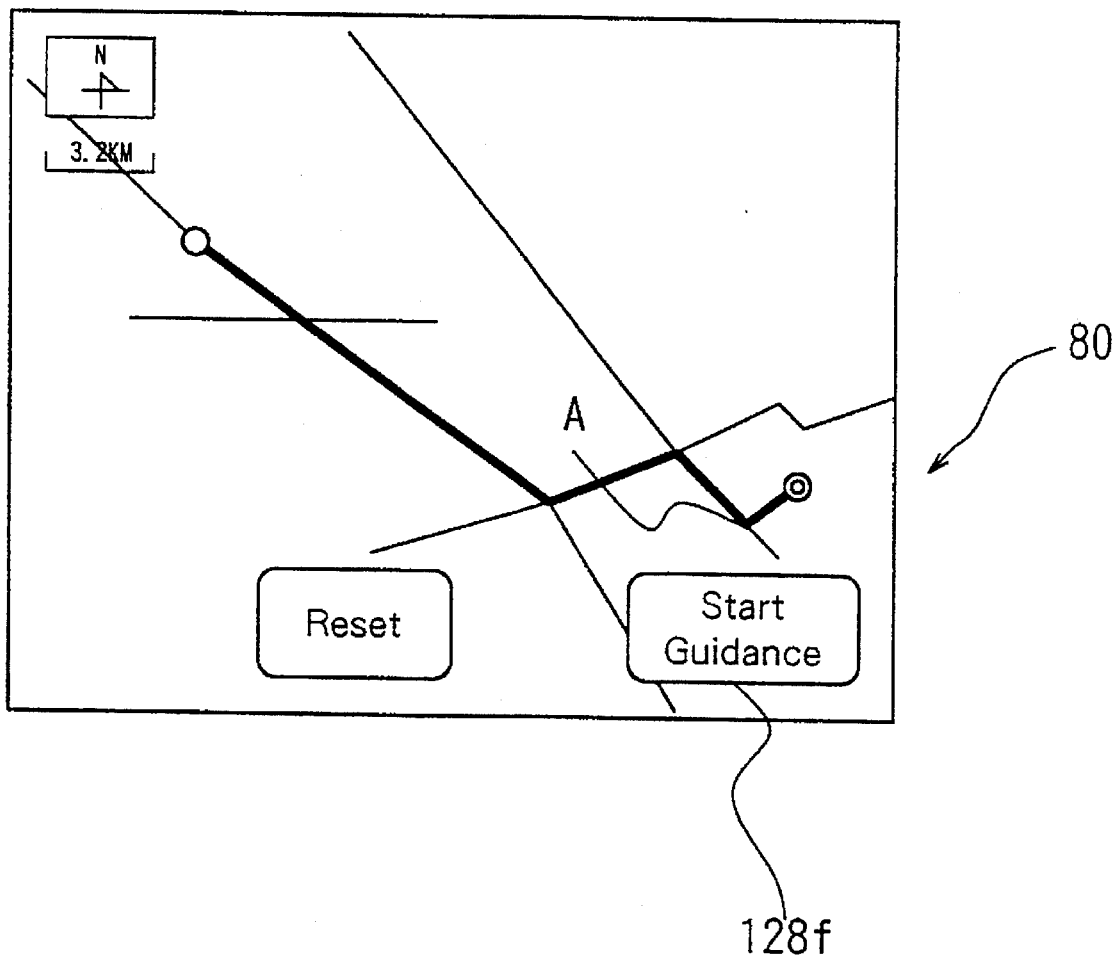
FIG. 10 is a diagram illustrating one example of a whole route map on the display section of the same system after the route has been re-searched.

The route re-search map 70 is displayed with a reset button 128e for fixing the searched route. If this reset button 128e is pushed, a newly fixed map 80 of the whole route is opened, as shown in FIG. 10. In the present example, a new route to point A is displayed as the route closest to the initial one from the point of deviation, in addition to the previous route. If a guidance start button 128f is pushed, the guidance is started again.

The vocal control section 30 synthesizes voice, for example, phrases, single sentences, sounds and so on, which are read from a vocal storage section 32, in response to a vocal guide instruction from the route guide control section 26, and outputs the synthesized voice from the speaker 34. The vocal storage section 32 stores, in a compressed state, the vocal guide data such as the operation guidance for setting the route and the names of landmarks on the route, i.e. the vocal guide data necessary for the vocal guidance during the route guidance. Furthermore, the vocal control section 30 outputs the landmark names, which are displayed in the whole route map, vocally from the speaker 34 when display of the whole route map is requested, which names are received from the route guide control section 26. In the present example, the vocal guidance with reference to a landmark is exemplified by "Route through Nagoya Interchange of Tollway".

Figure 11:
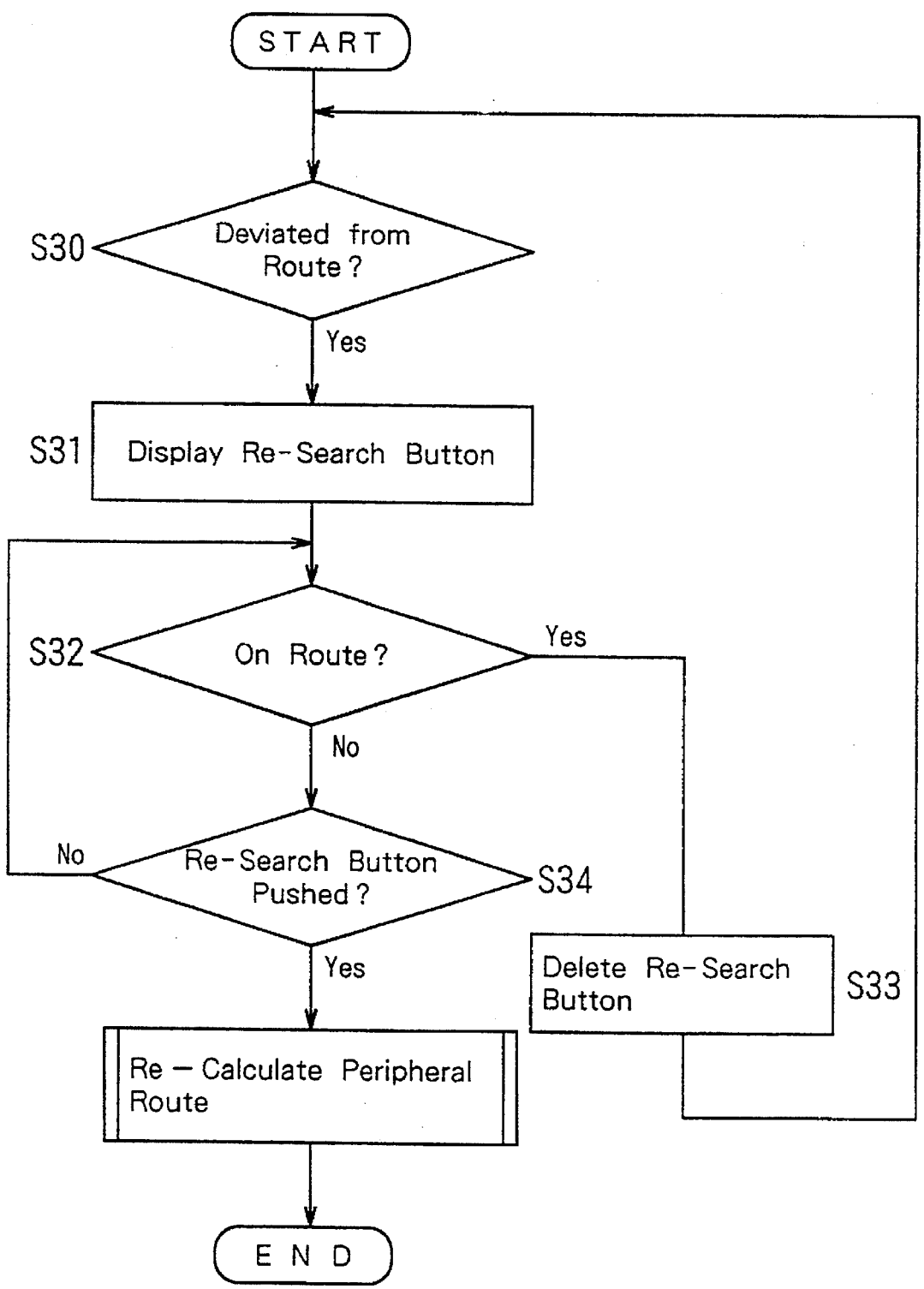
FIG. 11 is a flowchart illustrating a series of operations for searching for the shortest route from the area of the present location to a previously determined (or preselected) route.

Here will be described the processing for re-searching to determine the new route to be followed upon inadvertent deviation from the previously determined route. FIG. 11 is a flowchart illustrating a first embodiment of the route re-search which is a route search for effecting a quick rejoining into the initial route, not with preference for the shortest distance but, rather, with preference for maintaining the present, general traveling direction of the vehicle. Here, the deviation from the route is detected by a timer interruption. If a route deviation is detected (at S30), the re-search button is displayed (at S31), as shown in FIG. 8. Route deviation is then confirmed or it is decided that the vehicle is on route (at S32). In case, the "on route" is decided at S32, the re-search button is deleted (at S33) and the routine is returned to S30. Once deviation from the route is confirmed it is decided (at S34) whether the re-search button has been pushed. If NO, it is decided again (at S32) whether the vehicle is on route. When the re-search button is pushed ON, the re-calculation routine for the peripheral route is started. Thus, no "re-search" program can be initiated when the vehicle is on route.

Figure 12:
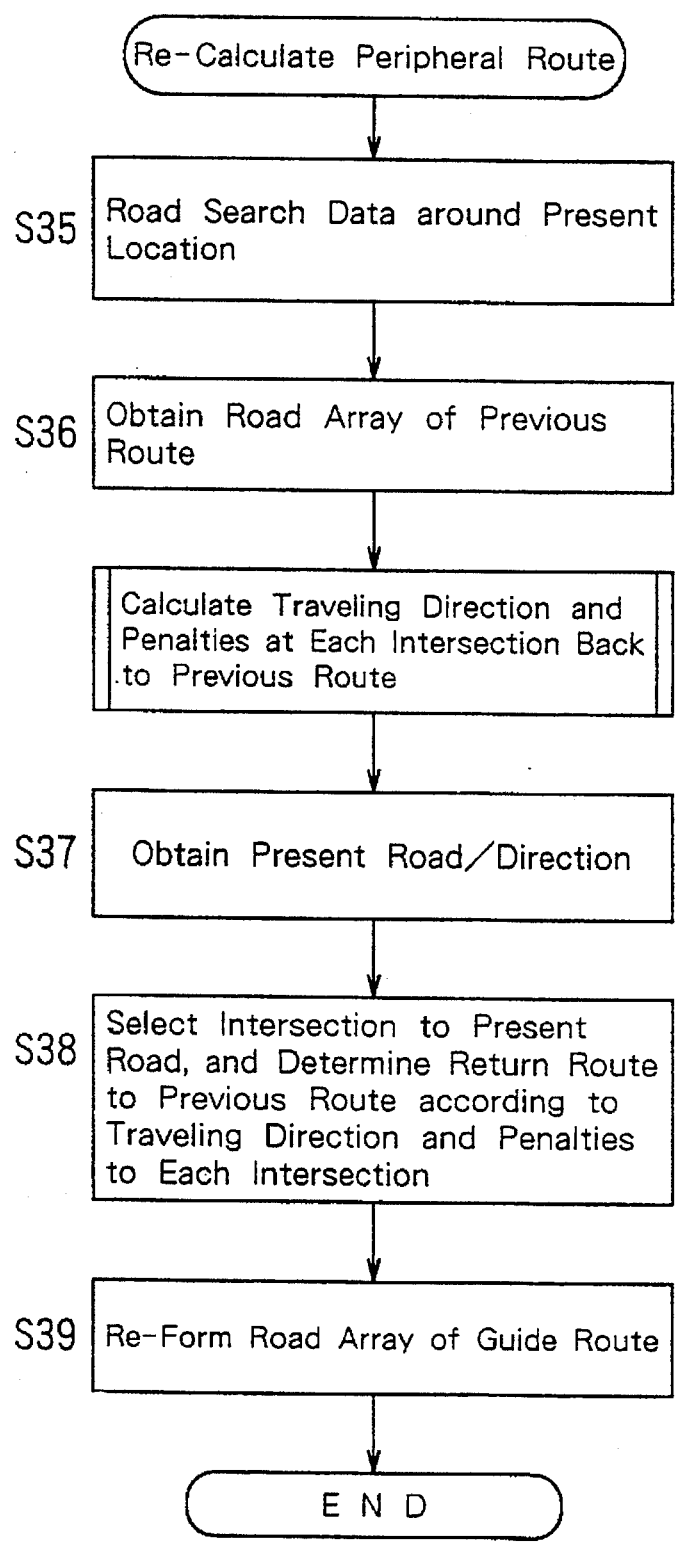
FIG. 12 is a flowchart for re-calculating the optimum route from the immediate area of the present location to the previously determined or preselected route.
Figure 13:
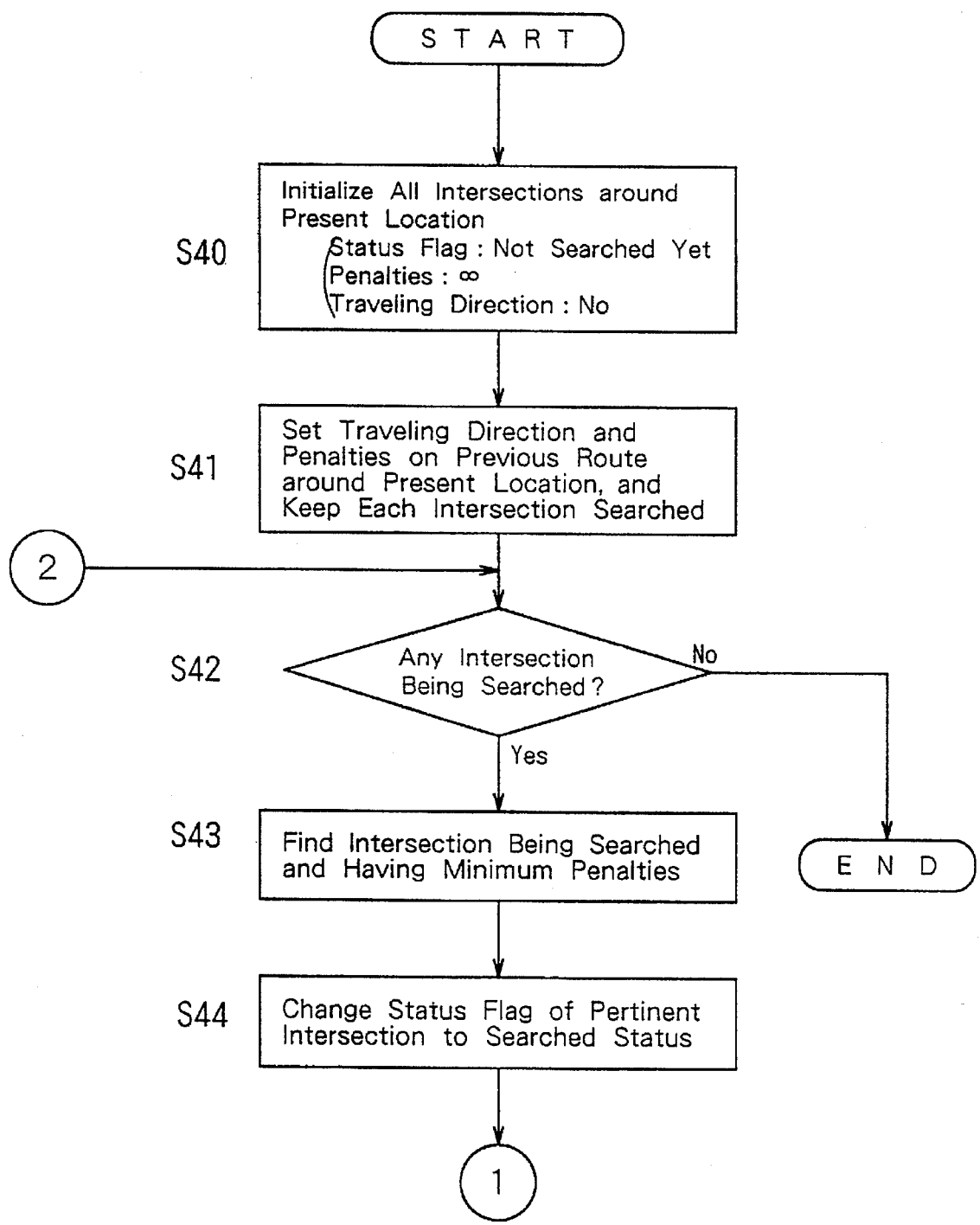
FIG. 13 is a flowchart for calculating options for traveling direction, and penalty associated with each option, at each intersection connecting the present location with the previous route
Figure 14:
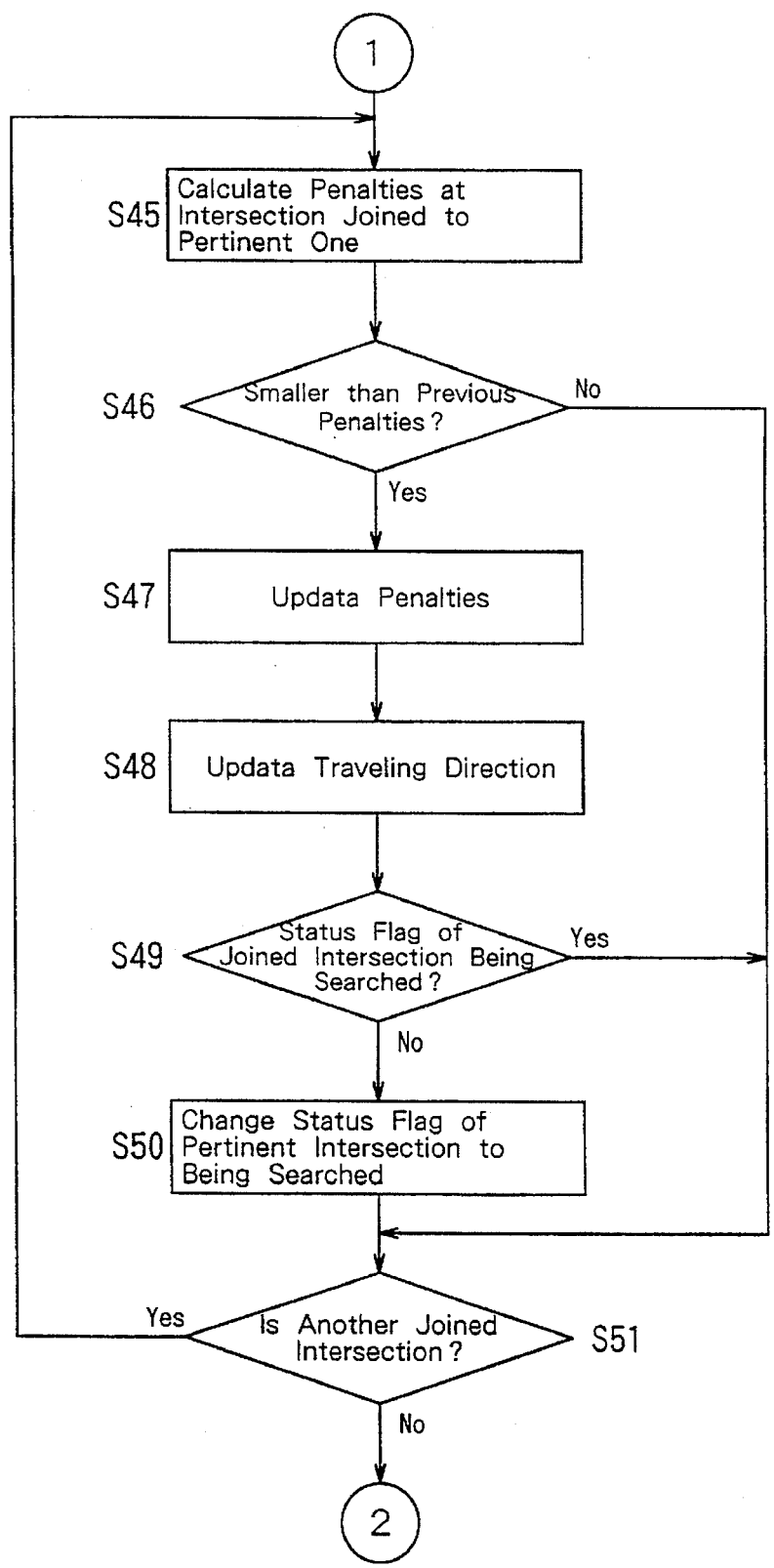
FIG. 14 is a flowchart which is a continuation of FIG. 13.
Figure 15A:
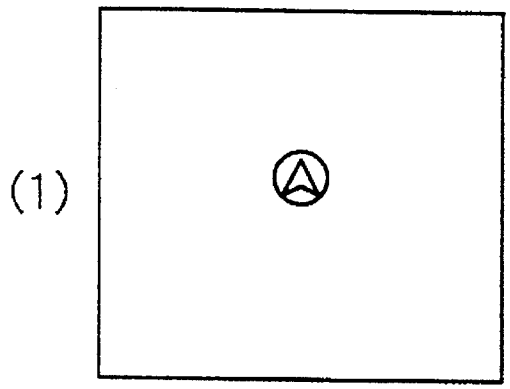
FIG. 15a through 15f a series of diagrams for illustrating the individual operations in the optimum route recalculations.
Figure 15B:
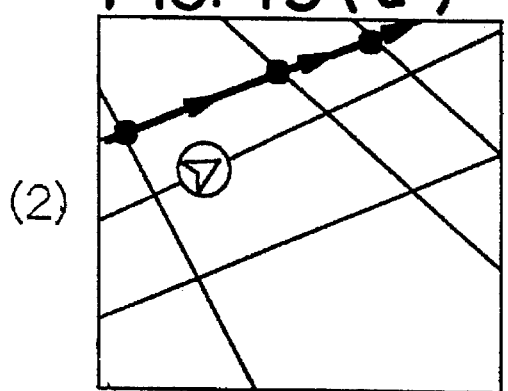

FIG. 12 is a flowchart illustrating a series of operations to be carried out in the peripheral route re-circulating routine. FIGS. 13 and 14 are flowcharts illustrating a routine for calculating the traveling direction and penalties at each intersection back to the previous route. FIGS. 15a–15f illustrates the processing contents of the individual steps in the peripheral route re-calculations. When the peripheral route re-calculation route is started, the search data for the vicinity around the present location of the vehicle are read (at S35) (as illustrated at FIG. 15a), at first from the registered data storage section 10b of the geographical information storage section 10. The road array data of the route (as will be referred to the "previous route"), along which the vehicle was guided before it deviated from the route, are obtained (at S36) (as illustrated at FIG. 15b) from the route memorizing section 24. Incidentally, the route is defined as the road array (as indicated by arrows on the route) obtained by joining the roads between the intersections. Moreover, the word "obtain" means to copy the data into the work area of the route-calculating section 22 from the route memorizing section 24.

Figure 15C:
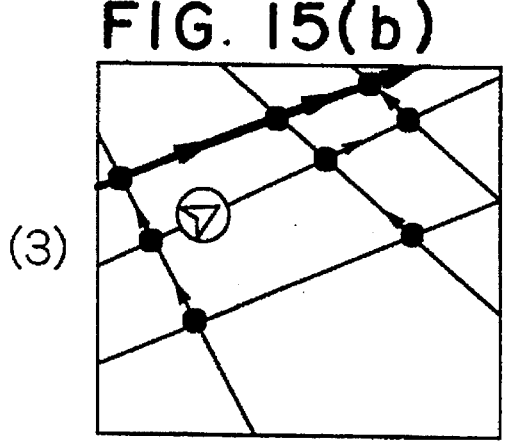

Then, the traveling direction and penalties at each intersection back to the previous route are calculated (as illustrated at FIG. 15c).

Specifically, all the intersections around the present location, are initialized (at S40) to set the status flag to "not searched yet", the penalties to "∞" and the traveling direction to "No". The traveling direction and penalties are set on the previous route around the present location (at S41) to keep each intersection searched. It is decided (at S42) whether any intersection is being searched. If YES, the intersection having the minimum penalties is found (at S43). If this intersection is found, the status flag of that intersection with minimum penalties is changed to the searched status (at S44). The penalties at the intersections joined to that intersection are calculated (at S45). These penalties are calculated in terms of the distance, the road width, signals, rightward or leftward turns and so on. If the roads are not joined in the presence of marks of "No Admittance" or "One Way" or at the time of a "U-turn", the penalties are calculated to "∞". Thus, the "penalty" for a given intersection is a total value of points of various amounts arbitrarily assigned to various difficulties to be encountered at an intersection.

It is decided (at S46) whether or not the calculated penalties are smaller than the previous ones. If NO, it is decided (at S51) whether or not there is another joined intersection. If YES, the penalties are updated (at S47), and the traveling direction is updated (at S48). It is decided (at S49) whether or not the status flag of the joined intersection is being searched. If YES, it is further decided (at S51) whether or not there is another joined intersection. If the joined intersection is not being searched, the status flag of this intersection is changed to being searched (S50). After this, it is decided (at S51) whether or not there is another joined intersection. If this answer is YES, the route is returned to S45, at which the penalties of the intersection joined to the existing intersection are calculated so that the operations of S46 to S51 are carried out according to the calculated result. In the absence of any other joined intersection, the routine is returned to S42, at which it is ended by deciding whether or not any intersection is being searched.

Figure 15D:
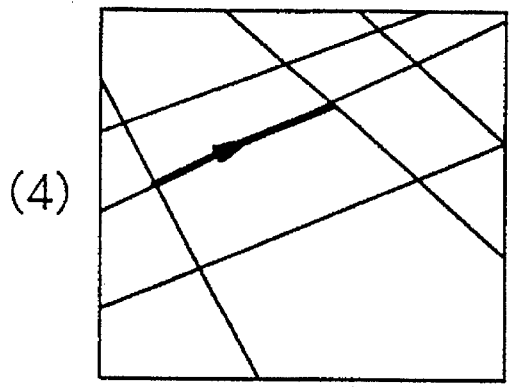
Figure 15E:
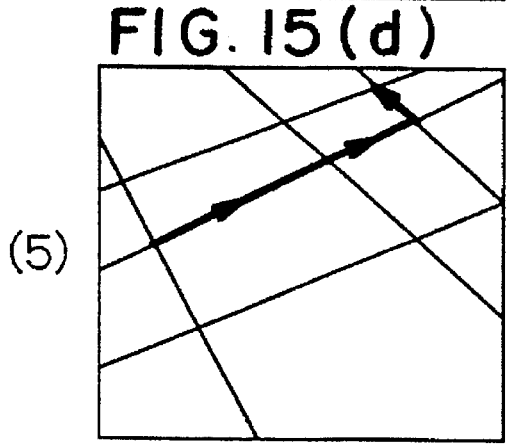
Figure 15F:
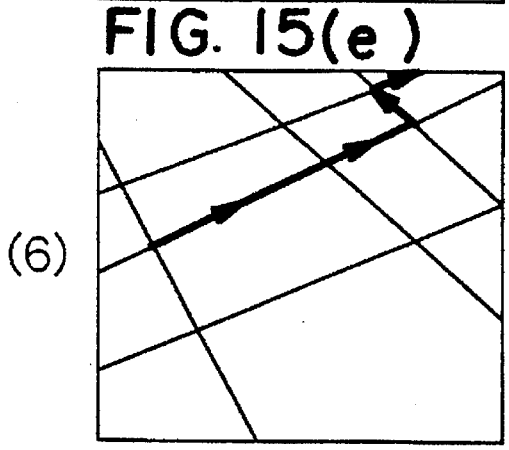

Reverting to the routine of FIG. 12, the present road and traveling direction of the vehicle are obtained (at S37) (as illustrated at FIG. 15d) on the basis of the information of the present location from the present locator section 12 and the geographical information from the geographical information storage section 10. Subsequently, on the basis of the traveling direction at each intersection, which was calculated by the operations of FIGS. 13 and 14, a search is made (at S38) (as illustrated at FIG. 15a) for a route from the present location to the previous route. The road array of the searched route (or new route) and the previous route is formed (at S39) (as illustrated at FIG. 15f) as a forthcoming guide route. On the basis of this road array thus re-formed, the route data for calculations stored in the route memorizing section 24 are set, and the new guidance is then started.

Figure 16:
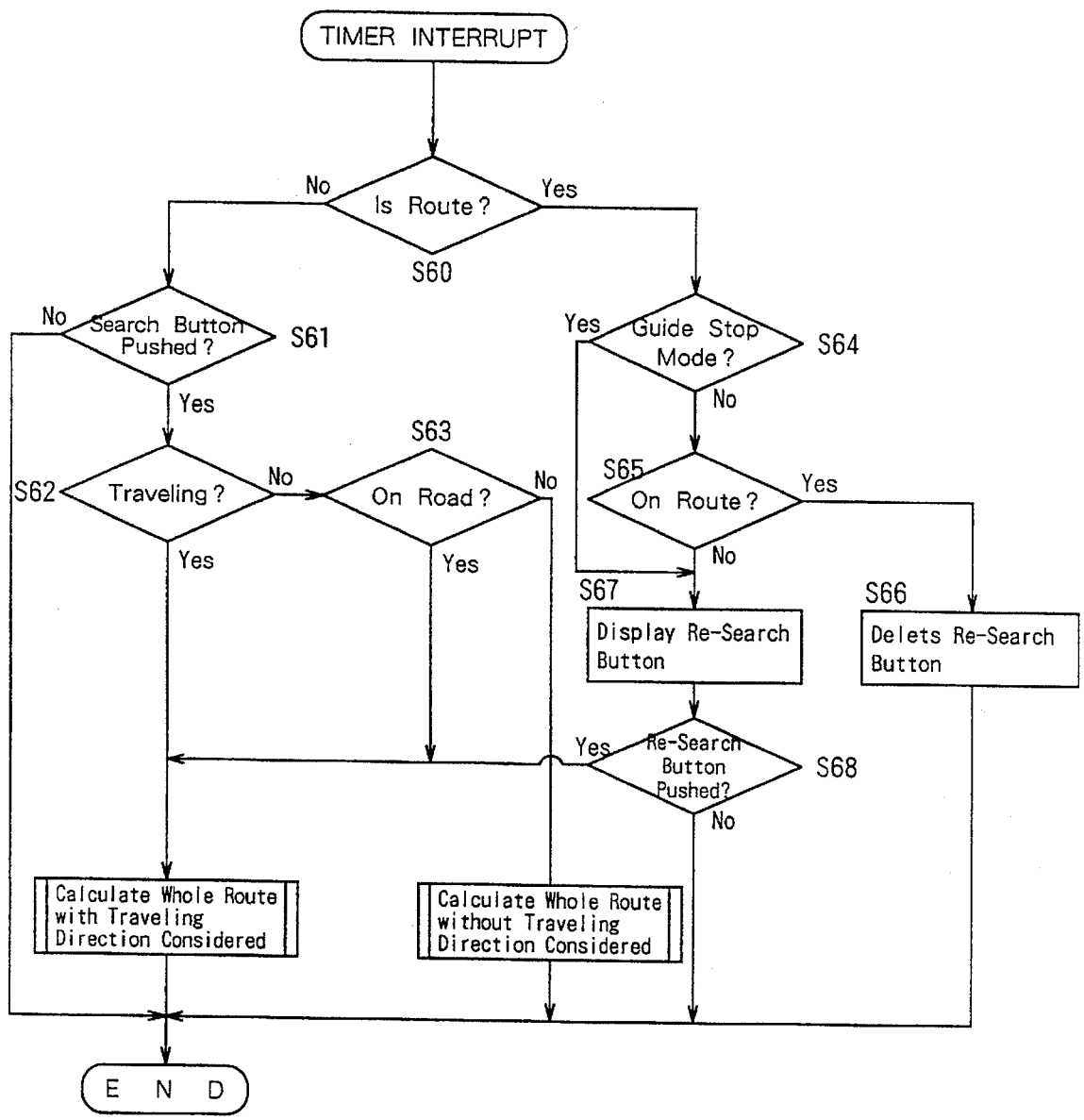
FIG. 16 is a flowchart for re-searching other routes.
Figure 19:
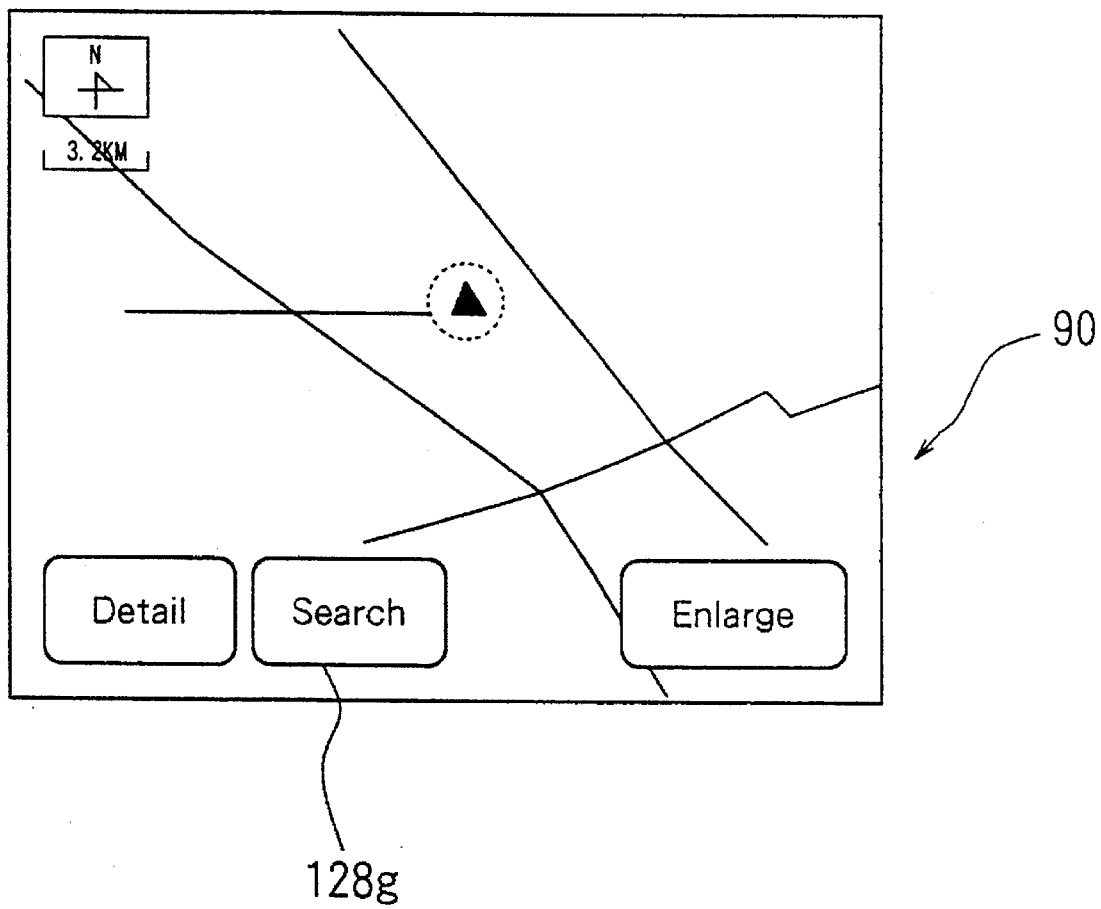
FIG. 19 is a diagram illustrating one example of a route search map on the display section of the same system.

FIG. 16 is a flowchart illustrating a second embodiment of the route re-searching routine. This embodiment is a route search which does not consider the initial route but, rather, considers the traveling direction in case of a deviation from the route. This route re-search is operated in a route re-search map 90 which is used for setting the route 90, as shown in FIG. 19. This map 90 is displayed with a search button 128g for instructing an execution of the route search.

First of all, it is decided (at S60) whether or not an effective route is stored at present in the route memorizing section 24. If NO, it is decided (at S61) whether or not the search button has been pushed. If this button is not pushed, the routine is ended. If the button is pushed, on the other hand, it is decided (at S62) whether the vehicle is traveling. If YES, the whole route calculating routine considering the traveling direction (as will be called the "first whole route calculating routine") is started. If the vehicle is not traveling, it is decided (at S63) whether the vehicle is on route. If YES, that is, if the vehicle stands still on the road, the first whole route calculating routine is started. Otherwise, that is, if the vehicle is off the road or in a parking area or a private place, a whole route calculating routine without consideration of traveling direction (as will be called the "second whole route calculating routine") is started.

If there is a route at the aforementioned S60, the guidance stop button is pushed, and it is decided (at S64) whether or not it is in the guidance stop mode. If YES, the re-search button is displayed (at S67) in the route search map. If not in the guidance stop mode it is decided (at S65) whether or not on route. If YES, the re-search button is deleted (at S66), and this routine is ended. If not on route, on the other hand, the re-search button is displayed (at S67), and it is decided (at S68) whether the same button has been pushed. If YES, the first whole route calculating routine is started. If not pushed yet, this routine is ended.

Figure 17:
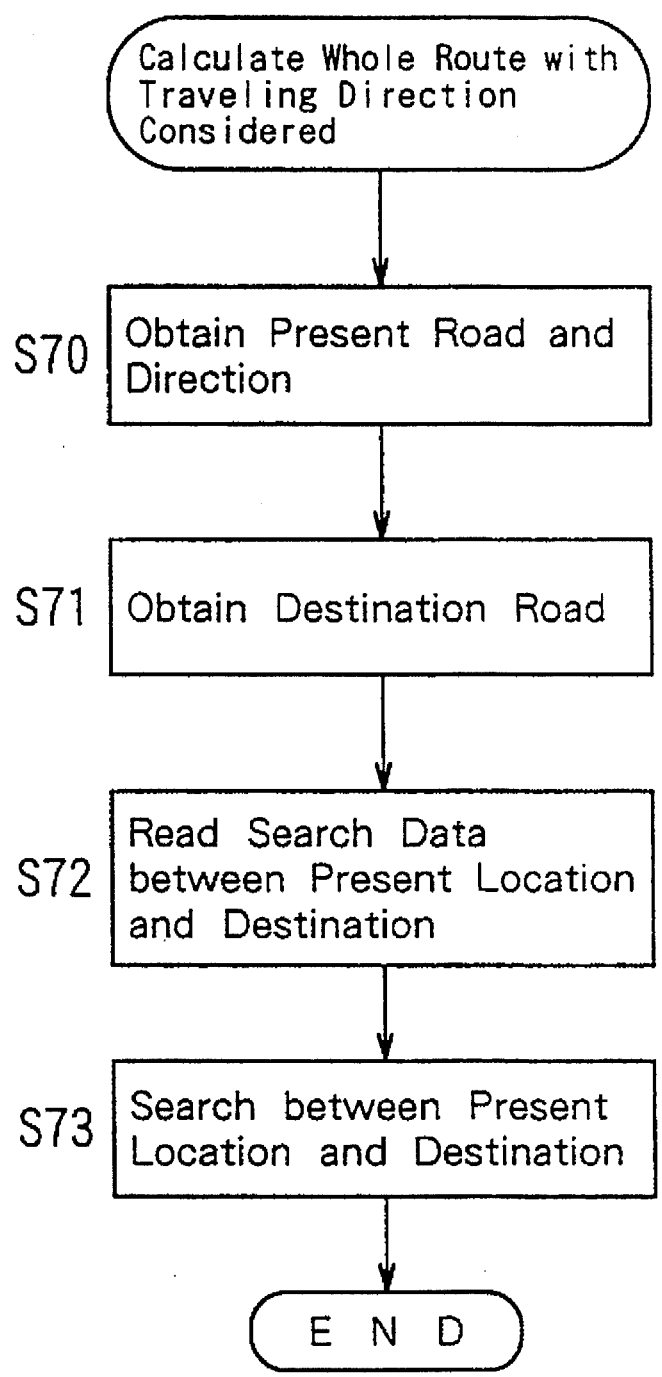
FIG. 17 is a flowchart for calculating the whole route taking the traveling direction into consideration.

Here will be described the first whole route calculating routine with reference to FIG. 17. First of all, the present road and traveling direction are obtained (at S70) from the present location information and the geographical information, and the destination road is obtained (at S71) from the destination information inputted and the geographical information. Next, the search data from the present location to the destination are read (at S72), and the connecting route is re-calculated and searched (at S73). The subsequent operation map is displayed as in the foregoing first embodiment.

Figure 18:
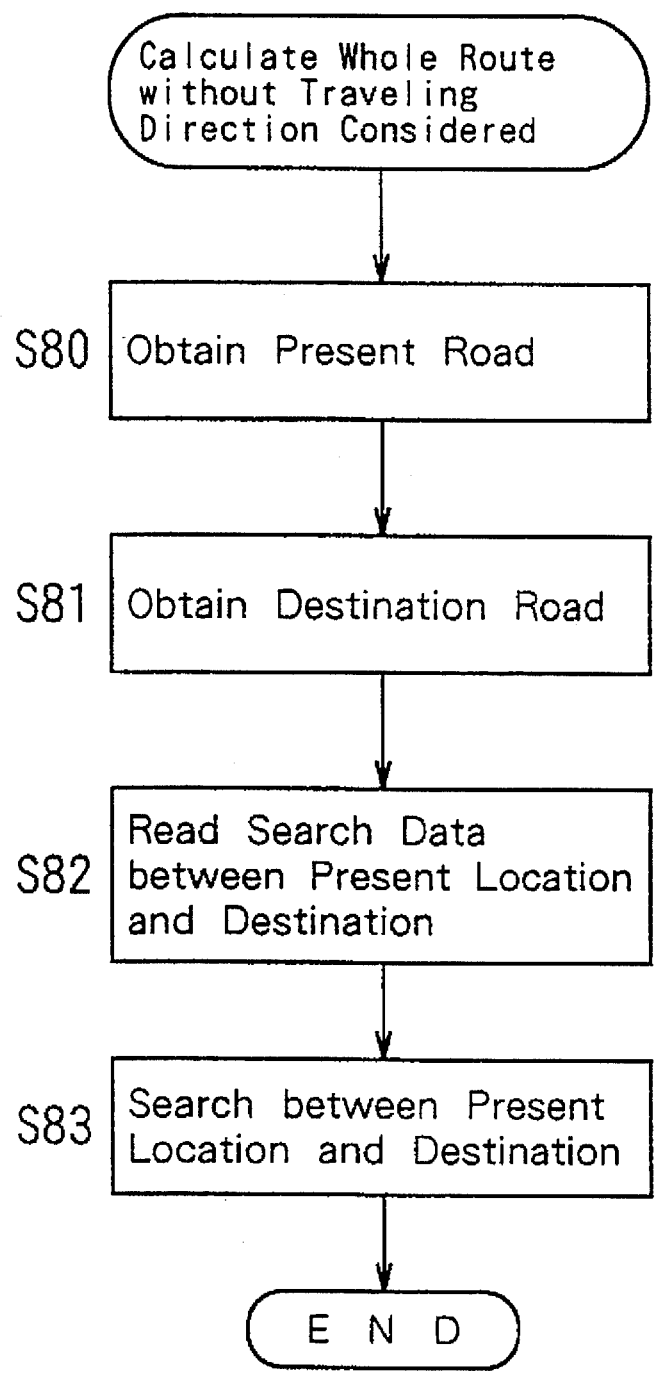
FIG. 18 is a flowchart for calculating the whole route when the traveling direction is not considered.

Here will be described the second whole route calculating routine with reference to FIG. 18. First of all, the present road is obtained (at S80) from the present location information and the geographical information, and the destination road is obtained (at S81) from the destination information inputted and the geographical information. Next, the search data between the present location and the destination are read (at S82), and the intermediate (connecting) route is recalculated and searched (at S83). The subsequent operation map is displayed as in the foregoing first embodiment.

Figure 20:
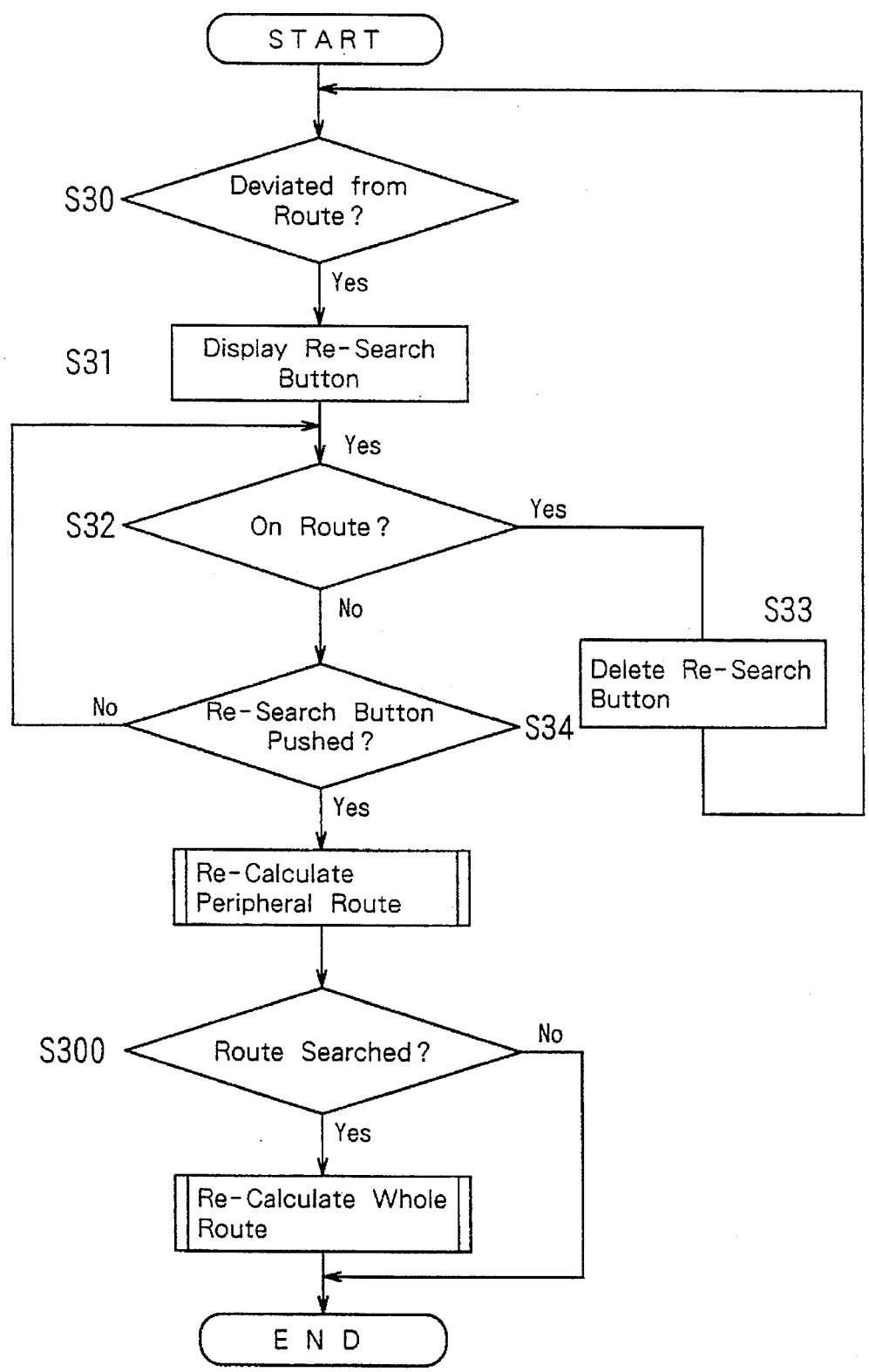
FIG. 20 is a flowchart for automatically selecting a search for the shortest route for return to the previous route and a search for an entirely new route.

FIG. 20 is a flowchart illustrating a third embodiment of the route re-searching routine. The present embodiment is characterized in the conditioned proper use of the first route search considering, not the first route, but the traveling direction and the second route search considering not the first route, but the traveling direction, in case the vehicle deviates from the first route. Incidentally, the first route search uses the steps S30 to S34 of the first embodiment, as shown in FIG. 11, and the peripheral route re-calculating routine, as shown in FIG. 12, whereas the second route search uses the whole route re-calculating routine, as shown in FIG. 18. Hence, their contents will not be described here.

First, the first route searching routine is executed to re-calculate the peripheral route. From this result, it is decided (at S300) whether the route has been searched. If YES, the search by the route is ended. On the other hand, in case the route cannot be searched because the road is closed, the second route search is executed to re-calculate the whole route. If a route is resultantly searched, the search by the route is ended.

In the present embodiment, it is decided as the setting condition for the present system whether or not the route could be searched. In addition, the condition for this decision may use the route closer to the destination, for example. Moreover, a prepared condition can be selected and inputted to the route re-search map.

As now apparent from the description thus far made, the following advantages can be achieved according to the present invention: (1) If a deviation from the route is detected, the stored search information pertaining to the vicinity of the present location is read, and the search from the present location to the previous route is executed while considering the previous route road array, the present road and the vehicular traveling direction, so that a route to rejoin the previous route can be quickly calculated by joining the searched route to the previous one. (2) In preference to the vehicular traveling direction based on the search information between the present location and the destination, the whole route from the present location to the destination is searched to guide the driver along a new route different from the previous one. As a result, the driver can search another route while intentionally leaving the previously determined route, as dictated by road circumstances such as traffic congestion or construction. Without this function, the driver would be required to search the route by re-inputting the present location and the destination at a position off the route. (3) The route to rejoin the previous one found by searching it around the present location and the new route by the whole route searching are automatically selected according to either the condition inputted by the driver himself or the preset condition. For example, if the driver recognizes that the vehicle has missed the route initially selected and selects the re-searching function, the present system searches the route for returning to the previous route as soon as possible in preference to the traveling direction of the vehicle. In case, however, the peripheral search of the present location (off the initial route) has found no route back to the initial route, the present system automatically searches for a route other than the previous route, e.g. initial route, in preference to the vehicular traveling direction. Thanks to this route search, the guidance to the destination is re-opened without stopping the vehicle.

What is claimed is:

1. A vehicular navigation system for automatically guiding a driver of a vehicle to a destination, comprising:

present-position determining means for determining the present location and present direction of travel of the vehicle;

geographical information storage means for storing geographical data inclusive of navigation information and guide information, which navigation and guide information can be used to calculate routes and to guide a driver along calculated routes;

destination input means for inputting a destination;

initial route calculating means for retrieving geographical data from the geographical information storage means and for using the retrieved first geographical data to calculate a guidance route from the present location to the destination;

route storage means for storing data of the guidance route;

route guide control means for retrieving guidance route data from the route storage means and for using the retrieved guidance route data to guide a driver to the destination;

detecting means for detecting a deviation of the vehicle from the guidance route;

re-calculation command input means responsive to the detecting means detecting a deviation for commanding a route re-calculation;

re-calculating means responsive to a route re-calculation command from the re-calculation command input means for retrieving from the geographical information storage means a subset of said geographical data related to a vicinity of the detected present location, for retrieving guidance route data from the route storage means, for searching said subset of geographical data to select an optimum rejoinder point on the guidance route within said vicinity of the detected present position, for using the retrieved subset of geographical data to calculate a correcting route from the detected present location to the selected rejoinder point on the guidance route in accordance with the detected present direction of travel, for combining route data for the selected correcting route with a portion of the guidance route data retrieved from the route storage means to form a new guidance route consisting of the correcting route and a section of said guidance route extending from said rejoinder point to said destination, and for replacing the stored data in the route storage means with the combined data forming the new guidance route; and whereby said route guide control means after re-calculation by said re-calculation means guides the driver in accordance with the combined data forming the new guidance route.

2. The vehicular navigation system of claim 1 wherein said recalculating means calculates the correcting route by determination of the shortest route between the detected present position and the guidance route and setting said shortest route as the correcting route.

3. The vehicular navigation system of claim 1 wherein said re-calculating means calculates the correcting route by linking together prioritized intersections located in the vicinity of the detected present position, said prioritized intersections being those intersections located by said re-calculating means in the vicinity of the detected present position having the lowest total penalty values, said re-calculating means assessing intersections located in the vicinity of the present position penalty values on the basis of distance between the detected present position and the guidance route and traffic signals.

4. The vehicular navigation system of claim 1 wherein said recalculating means selects as said rejoinder point a point on the guidance route ahead of the detected present location.

5. A vehicular navigation system for automatically guiding a driver of a vehicle to a selected destination, comprising:

geographical information storage means for storing geographical data inclusive of navigation information and guide information which navigation and guide information can be used to calculate routes and to guide a driver along calculated routes;

present position determining means for determining the present location and present direction of travel of the vehicle;

destination input means for inputting a destination;

initial route calculating means for retrieving first geographical data from the geographical information storage means and for using the retrieved first geographical data to calculate a guidance route from the present location to the destination;

route storage means for storing data of the guidance route;

route guide control means for retrieving guidance route data from the route storage means and for using the retrieved guidance route data to guide a driver to the destination;

detecting means for detecting a deviation of the vehicle from the guidance route;

re-calculating means, responsive to the detecting means detecting a deviation, for retrieving second geographical data from the geographical information storage means, for retrieving guidance data from the route storage means, for using the retrieved second geographical data to calculate a correcting route from the detected present location to a rejoinder point on the guidance route, for combining route data of the correcting route with a portion of the guidance route data retrieved from the guidance storage means to form a first new route consisting of the correcting route and a section of said guidance route extending from said rejoinder point to said destination, and for using the retrieved second geographical data to calculate a second new route from the detected present location to the selected destination; and means for selecting said first new route or said second new route according to an input condition or a set condition to replace the guidance route data in said route storage means with data of the selected first or second new route, and whereby the route guide control means guides the driver according to the selected new route.

6. The vehicular navigation system of claim 5 wherein said re-calculating means calculates the correcting route by determination of the shortest route between the detected present position and the guidance route and setting said shortest route as the correcting route.

7. The vehicular navigation system of claim 5 wherein said re-calculating means calculates the correcting route by linking together prioritized intersections located in the vicinity of the detected present position, said prioritized intersections being those intersections located by said re-calculating means in the vicinity of the detected present position having the lowest total penalty values, said re-calculating means assessing intersection located in the vicinity of the present position penalty values on the basis of distance between the detected present position and the guidance route and traffic signals.

* * * * *